(12) United States Patent
Bernstein et al.

(10) Patent No.: US 8,930,773 B2
(45) Date of Patent: Jan. 6, 2015

(54) DETERMINING ROOT CAUSE

(75) Inventors: Ruth Bernstein, Kiryat Ono (IL); Ira Cohen, Modiin (IL); Eran Samuni, Ramat Gan (IL); Keren Gattegno, Rishon Le-Zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 13/447,711

(22) Filed: Apr. 16, 2012

(65) Prior Publication Data

US 2013/0275812 A1 Oct. 17, 2013

(51) Int. Cl.
*G06F 11/00* (2006.01)

(52) U.S. Cl.
USPC .......................................... 714/47.1; 714/48

(58) Field of Classification Search
CPC ........................... G06F 11/0754; G06F 11/079
See application file for complete search history.

(56) References Cited

U.S. PATENT DOCUMENTS

| | | | |
|---|---|---|---|
| 6,701,459 B2 | 3/2004 | Ramanathan et al. | |
| 7,003,433 B2 * | 2/2006 | Yemini et al. | 702/183 |
| 7,818,418 B2 | 10/2010 | Bansal et al. | |
| 7,877,642 B2 | 1/2011 | Ding et al. | |
| 7,992,040 B2 | 8/2011 | Agarwal et al. | |
| 8,347,144 B2 * | 1/2013 | Khalak et al. | 714/26 |
| 8,407,170 B2 * | 3/2013 | Harrison et al. | 706/45 |
| 2011/0040808 A1 | 2/2011 | Joy et al. | |

FOREIGN PATENT DOCUMENTS

WO 03005200 1/2003

OTHER PUBLICATIONS

Unknown., "Predictive Analytics for IT", Retrieved on Mar. 21, 2012 from http://www.netuitive.com/products/, 3 pages.

* cited by examiner

*Primary Examiner* — Michael Maskulinski

(57) ABSTRACT

Methods, systems, and computer-readable media with executable instructions stored thereon for determining root cause are provided. A method for determining root cause can include receiving values for at least one performance metric for each of a plurality of components of an IT system to establish a normal value for each of the performance metrics, receiving an abnormal value that differs from the normal value for at least one of the plurality of components of the IT system, and determining a probability that the at least one of the plurality of components of the IT system is a root cause of the abnormal value.

13 Claims, 3 Drawing Sheets

DETERMINING ROOT CAUSE

BACKGROUND

Information technology (IT) can refer to the use of computing devices to manage information. IT management can include managing a variety of areas, such as computing devices, computer software, information systems, computer hardware, and processes related thereto. Problems in IT systems can cause reduced response times or even downtime.

DETAILED DESCRIPTION

Figure 1:
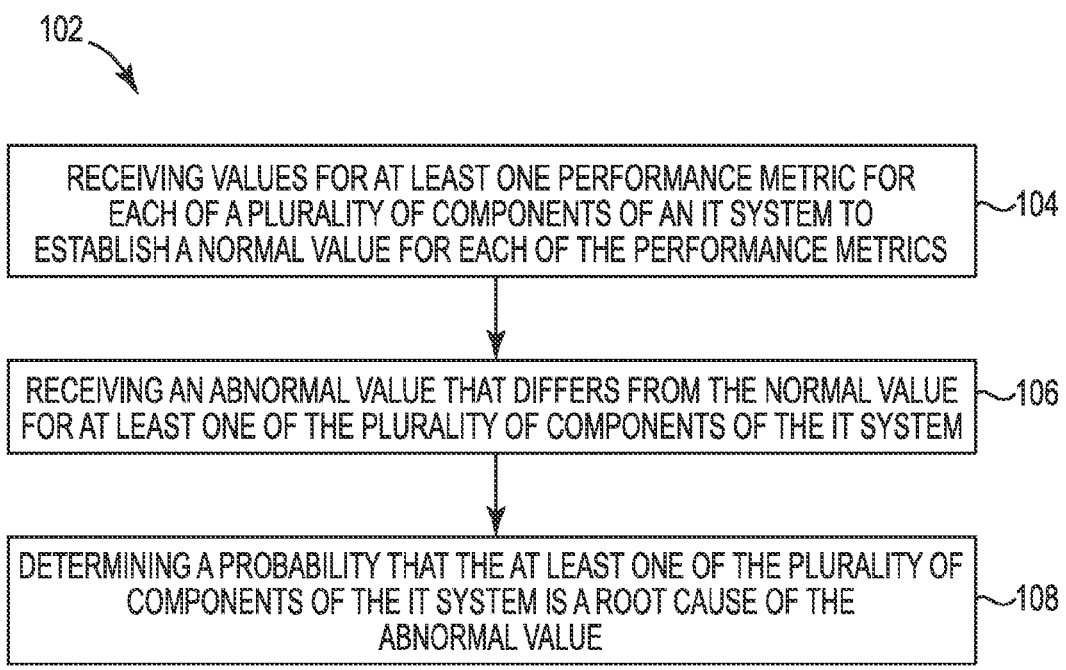
FIG. 1 is a flow chart illustrating an example of a method for determining root cause.

Examples of the present disclosure include methods, systems, and computer-readable media with executable instructions stored thereon for determining root cause. As an example, a method for determining root cause can include receiving values for at least one performance metric for each of a plurality of components of an IT system to establish a normal value for each of the performance metrics, receiving an abnormal value that differs from the normal value for at least one of the plurality of components of the IT system, and determining a probability that at least one of a plurality of components of an IT system is a root cause an abnormal value. The abnormal value can be a symptom of a problem that is caused by an IT component of the IT system, e.g., the IT component is the root cause.

IT systems can include a number, e.g., hundreds or even more, of IT components. IT components can include, but are not limited to computing devices, computer software, information systems, computer hardware, and processes related thereto. When a problem occurs with an IT component it can affect other components of the IT system. For example, a problem with an IT component can cause that IT component and/or other IT components to provide slower response times or even cause downtime. Slower response times and/or downtime, along with other effects that a problem to an IT component can cause, are undesirable. Therefore, it is desirable to resolve problems with IT components quickly. Advantageously, examples of the present disclosure may help reduce the time it takes to resolve a problem with an IT component by determining a probability that at least one of a plurality of IT components of an IT system is a root cause, e.g., at least one of a plurality of IT components causes an abnormal value due to a problem with the IT component. With this determined probability, an IT operator can direct efforts to resolve the problem toward the IT component that is most likely the root cause of the problem.

In the present disclosure, reference is made to the accompanying drawings that form a part hereof, and in which is shown by way of illustration how one or more examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 is a flow chart illustrating an example of a method 102 for determining root cause. The method 102 includes receiving values for at least one performance metric for each of a plurality of components of an IT system to establish a normal value for each of the performance metrics at 104.

Types of performance metrics include, but are not limited to, free memory, page fault rate, and central processing unit (CPU) utilization, among other performance metrics. Values for performance metrics can be received by a monitor or a plurality of monitors that monitor the IT components of an IT system. Values for performance metrics can be received at differing times for various applications. For example, values for performance metrics can be received in real time and/or periodically. The monitor or the plurality of monitors that monitor the IT components of an IT system can be part of a virtual monitoring system and/or a real monitoring system. For example, monitoring of the IT system may include employing a load simulator (such as, for example, Load Runner™), which simulates loads on the system by generating loads inflicted by virtual users in order to examine system behavior and performance and studying the system response to these loads. Monitoring the IT system can include real user monitoring, e.g., which is embedded in Business Service Management (BSM). Real user monitoring can allow monitoring performance, e.g., performance metrics of IT components, when real users are interacting with the IT system, in real-time.

The received values for the performance metrics can be used to establish a normal value for each of the performance metrics. Establishing the normal value may be a process preformed over a time interval, for example. Establishing the normal value, which may also be referred to as establishing a baseline, can include employing a statistical calculation, such as, the Holt-Winters algorithm, an estimation of average and standard deviations, a time series based statistics estimation accounting for trend and seasonal behavior, among other statistical calculations.

The method 102 includes receiving an abnormal value that differs from the normal value for at least one of the plurality of components of the IT system at 106. For various applications, differing scales can be employed to determine that a value is an abnormal value. For example, the abnormal value can be a received value that is a different value than the normal value, or the abnormal value can be a received value that is outside of a range associated with the normal value. A time $t_b$ is the time the abnormal value is received.

The method 102 includes determining a probability ($P(n_i)$) that the at least one of the plurality of components of the IT system is a root cause of the abnormal value at 108. As mentioned, with this determined probability, an IT operator can advantageously direct efforts to resolve the problem toward the IT component that is most likely of being the root cause of the abnormal value.

Determining the probability that the at least one of the plurality of components of the IT system is the root cause of the abnormal value can include determining a probability ($P(m_j)$) that the abnormal value is abnormal behavior rather than systemic noise. Determination of the probability ($P(m_j)$) that the abnormal value is abnormal behavior rather than systemic noise can include a statistical calculation. For example, a baseline confidence value can be calculated for each performance metric. The baseline confidence value may represent a probability of a normal value being received for a performance metric, e.g., the performance metric is exhibiting normal behavior. Therefore, the probability ($P(m_j)$), which is equal to 1 minus the baseline confidence value, can represent a probability that the received abnormal value is abnormal behavior, e.g., caused by a problem with an IT component, rather than being systemic noise. A time $t_j$ is the time that the abnormal behavior begins. Examples of the present disclosure provide that the probability ($P(m_j)$) is a real number between [0, 1].

Determining the probability that the at least one of the plurality of components of the IT system is the root cause of the abnormal value can include determining a temporal probability ($R_1(m_j)$) that the at least one of the plurality of components of the IT system is the root cause of the abnormal behavior. The temporal probability ($R_1(m_j)$) utilizes a proximity to the time $t_b$ of the received abnormal value to the time $t_j$ that the abnormal behavior begins. An IT component is more likely to be a root cause of the abnormal value if the IT component causes an abnormal value early in the abnormal behavior. The temporal probability ($R_1(m_j)$) can be determined by the equation $R_1(m_j) = P(m_j)^{(T(m_j))}$, where $T(m_j) = \{t_b - t_j, t_b > t_j; 0, t_b \le t_j\}$. Because ($P(m_j)$) is a real number between [0, 1], applying the exponent $T(m_j)$ will decrease the value of ($R_1(m_j)$).

Determining the probability that the at least one of the plurality of components of the IT system is the root cause of the abnormal value can include determining a temporal consistency of the detected abnormal behavior. The temporal consistency of the detected abnormal behavior can be employed as a factor of a number of abnormal values that are received since the abnormal behavior has begun. An IT component is more likely to be a root cause of the abnormal value if the number of abnormal values associated with a particular IT component, e.g., abnormal values received since the abnormal behavior has begun, are high relative to other IT components.

The temporal consistency ($R_2(m_j)$) of the detected abnormal behavior as a function of the temporal probability and a number of received abnormal values and a number of normal values. Some examples of the present disclosure provide that the number of received abnormal values and the number of normal values can be weighted. The temporal consistency ($R_2(m_j)$) can be determined by the equation $R_2(m_j) = R_1(m_j)^{(A_j+1-N_j/w)}$, where $A_j$ is a number of abnormal values detected, $N_j$ is a number of normal values detected, and w is a weight of normal values to abnormal values.

Determining the probability that the at least one of the plurality of components of the IT system is the root cause of the abnormal value can include determining a number of abnormal behaviors ($R_a(m_j)$) associated with each of the plurality of components of the IT system. An IT component is more likely to be a root cause of there are a greater number of abnormal behaviors associated with a particular IT component, as compared to other IT components having a lesser number of abnormal behaviors associated thereto. The number of abnormal behaviors ($R_a(m_j)$) associated with each of the plurality of components of the IT system can be determined by the equation $R_a(m_j) = R_2(m_j)^{\log_m M_i}$, where m is an adjustable variable and $M_i$ is a number of performance metrics for a component i of the IT system.

Examples of the present disclosure provide that the probability ($P(n_i)$) that the at least one of the plurality of components of the IT system is a root cause of the abnormal value can be determined as an average number of abnormal values associated with each of the plurality of components of the IT system. For example, that the probability ($P(n_i)$) that the at least one of the plurality of components of the IT system is a root cause of the abnormal value can be determined by the equation $$P(n_i) = \frac{1}{M_i} \sum_j R_a(m_j).$$

A relatively greater value for ($P(n_i)$), where $n_i$ represents IT component i, will tend to indicate that that the particular IT component associated with that IT component is less likely to be a root cause of the abnormal value as compared to another IT component ($P(n_{i+1})$), where $n_{i+1}$ represents IT component i+1, which has a relatively lesser value for ($P(n_{i+1})$). As an example, a score ($S(n_i)$) for a particular IT component can be determined by taking a complimentary value of the probability ($P(n_i)$) that the at least one of the plurality of components of the IT system is a root cause of the abnormal value. The score ($S(n_i)$) can be determined by the equation $S(n_i) = 1 - P(n_i)$. With the determined probabilities for IT components of an IT system, an IT operator can direct efforts to resolve a problem toward the IT component that is most likely of being the root cause of the abnormal value, for example an IT component having the lowest, relative to other IT components of the IT system, probability ($P(n)$) that the at least one of the plurality of components of the IT system is a root cause of the abnormal value, which would correspond to the relatively greatest score ($S(n)$).

Figure 2:
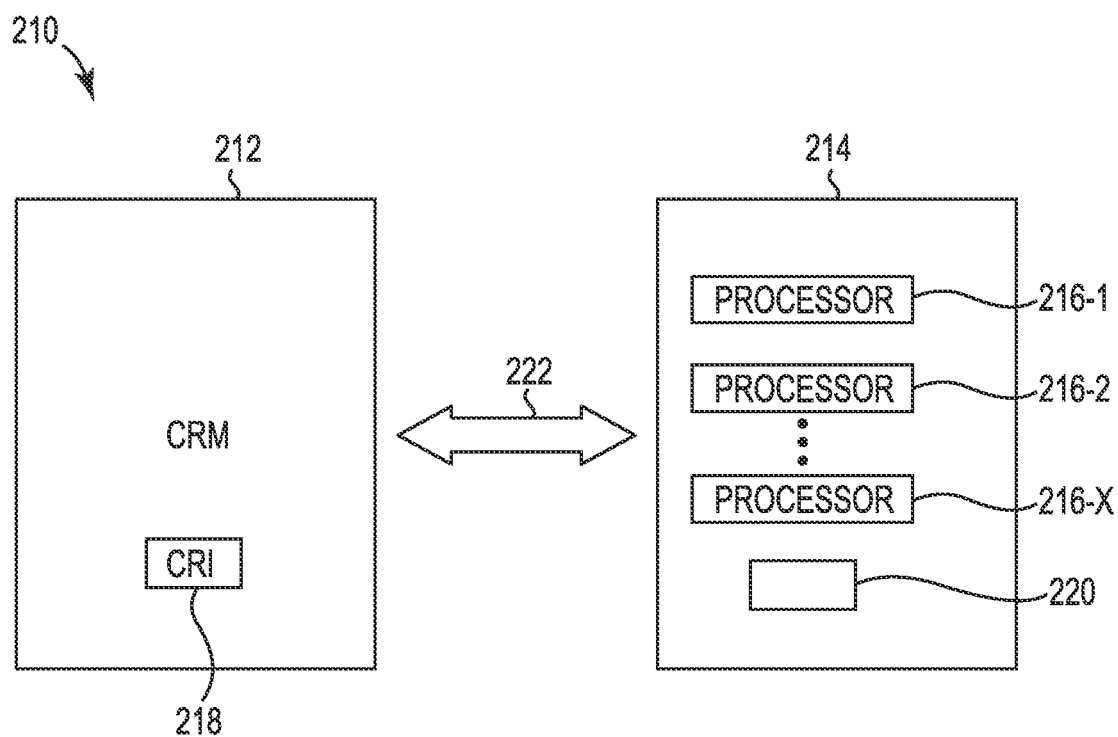
FIG. 2 illustrates a block diagram of an example of a computer-readable medium in communication with processing resources for determining root cause according to the present disclosure.

FIG. 2 illustrates a block diagram 210 of an example of a computer-readable medium 212 in communication with processing resources 216-1, 216-2, . . . , 216-X for determining root cause according to the present disclosure. Computer-readable medium (CRM) 212 can be in communication with a computing device 214 having processor resources of more or fewer than 216-1, 216-2, . . . , 216-X, where X is an integer, that can be in communication with, and/or receive a tangible non-transitory CRM 212 storing a set of computer-readable instructions 218 executable by one or more of the processor resources (e.g., 216-1, 216-2, . . . , 216-X) for determining root cause as described herein. The computing device 214 may include memory resources 220, and the processor resources 216-1, 216-2, . . . , 216-X may be coupled to the memory resources 220.

Processor resources can execute computer-readable instructions 218 for determining root cause and are stored on an internal or external non-transitory CRM 212. A non-transitory CRM (e.g., 212), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), Blu-ray discs (BD), compact discs (CD), and/or a solid state drive (SSD), flash memory, etc., as well as other types of CRM.

The non-transitory CRM 212 can be integral, or communicatively coupled, to a computing device, in either in a wired or wireless manner. For example, the non-transitory CRM can be an internal memory, a portable memory, a portable disk, or a memory located internal to another computing resource (e.g., enabling the computer-readable instructions 218 to be downloaded over the Internet).

The CRM 212 can be in communication with the processor resources (e.g., 216-1, 216-2, . . . , 216-X) via a communication path 222. The communication path 222 can be local or remote to a machine associated with the processor resources 216-1, 216-2, . . . , 216-X. Examples of a local communication path 222 can include an electronic bus internal to a machine such as a computer where the CRM 212 is one of volatile, non-volatile, fixed, and/or removable storage medium in communication with the processor resources (e.g., 216-1, 216-2, . . . , 216-X) via the electronic bus. Examples of such electronic buses can include Industry Standard Architecture (ISA), Peripheral Component Interconnect (PCI), Advanced Technology Attachment (ATA), Small Computer System Interlace (SCSI), Universal Serial Bus (USB), among other types of electronic buses and variants thereof.

The communication path 222 can be such that the CRM 212 is remote from the processor resources (e.g., 216-1, 216-2, . . . , 216-X) such as in the example of a network connection between the CRM 212 and the processor resources (e.g., 216-1, 216-2, . . . , 216-X). That is, the communication path 222 can be a network connection. Examples of such a network connection can include a local area network (LAN), a wide area network (WAN), a personal area network (PAN), and the Internet, among others. In such examples, the CRM 212 may be associated with a first computing device and the processor resources (e.g., 216-1, 216-2, . . . , 216-X) may be associated with a second computing device.

Processor resources 216-1, 216-2, . . . , 216-X coupled to the memory 220 can receive values for at least one performance metric for each of a plurality of components of an IT system to establish a normal value for each of the performance metrics. The processor resources 216-1, 216-2, . . . , 216-X can receive an abnormal value that differs from the normal value for at least one of the plurality of components of the IT system. Further, the processor resources 216-1, 216-2, . . . , 216-X can determine a probability that the at least one of the plurality of components of the IT system is a root cause of the abnormal value, wherein the probability determination includes a statistical calculation of a probability that the abnormal value is abnormal behavior rather than systemic noise.

Figure 3:
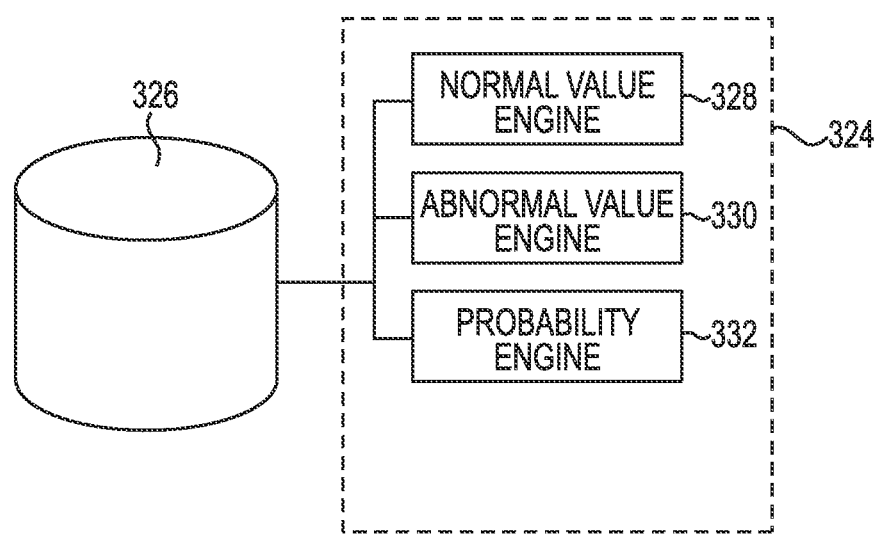
FIG. 3 illustrates a block diagram of an example of a system for determining root cause according to the present disclosure.

FIG. 3 illustrates a block diagram of an example of a system 324 for determining root cause according to the present disclosure. FIG. 3 depicts system 324 in communication with data store 326. Data store 326 represents generally any device or combination of devices configured to provide to and/or store data for use by system 324. Such data may include, for example, a value for a performance metric.

In the example of FIG. 3, system 324 includes normal value engine 328, abnormal value engine 330, and probability engine 332. Normal value engine 328 represents generally any combination of hardware and programming configured to receive values, e.g., from data store 326, for at least one performance metric for each of a plurality of components of an IT system and to establish a normal value for each of the performance metrics.

Abnormal value engine 330 represents generally any combination of hardware and programming configured to receive an abnormal value that differs from the normal value for at least one of the plurality of components of the IT system.

Probability engine 332 represents generally any combination of hardware and programming configured to determine a probability that the at least one of the plurality of components of the IT system is a root cause of the abnormal value. For example, probability engine 332 can be configured to determine a probability that the at least one of the plurality of components of the IT system is a root cause of the abnormal value, wherein the probability determination includes a statistical calculation of a complementary value ($P(m_j)$) of a baseline confidence that determines the abnormal value is abnormal behavior rather than systemic noise and determine a temporal probability ($R_1(m_j)$) by the equation: $R_1(m_j) = P(m_j)^{(T(m_j))}$, where $T(m_j) = \{t_b - t_j, t_b > t_j; 0, t_b \leq t_j\}$, $t_b$ is a time the abnormal value is received, and $t_j$ is a time the abnormal behavior begins.

Various examples of the present disclosure provide that the probability engine can be configured to determine a temporal consistency. For example, the probability engine can be configured to determine a temporal consistency ($R_2(m_j)$) by the equation: $R_2(m_j) = R_1(m_j)^{(A_j + 1 - N_j/w)}$, where $A_j$ is a number of abnormal values detected, $N_j$ is a number of normal values detected, and w is a weight of normal values to abnormal values.

A number of examples of the present disclosure provide that the probability engine can be configured to determine a number of abnormal values for each of the plurality of components of the IT system. For example, the probability engine is configured to determine a number of abnormal values for each of the plurality of components of the IT system by the equation: $R_a(m_j) = R_2(m_j)^{log_m M_i}$, where m is an adjustable variable and $M_i$ is a number of performance metrics for a component i of the IT system.

Some examples of the present disclosure provide that the probability engine can be configured to determine an average of the values corresponding to the number of abnormal values for each of the plurality of components of the IT system. For example, the probability engine can be configured to determine an average of the values corresponding to the number of abnormal values for each of the plurality of components of the IT system by the equation:

$$P(n_i) = \frac{1}{M_i} \sum_j R_a(m_j).$$

The above specification provides a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

The term "a number of" is meant to be understood as including at least one but not limited to one.

What is claimed:

1. A method for determining root cause, comprising:
   receiving values for at least one performance metric for each of a plurality of components of an IT system to establish a normal value for each of the performance metrics;
   receiving an abnormal value that differs from the normal value for at least one of the plurality of components of the IT system; and
   determining a probability that the at least one of the plurality of components of the IT system is a root cause of the abnormal value, wherein determining the probability includes a statistical calculation of a complementary value ($P(m_j)$) of a baseline confidence that determines the abnormal value is abnormal behavior rather than systemic noise and determine a temporal probability ($R_1(m_j)$) by the equation: $R_1(m_j)=P(m_j)^{(T(m_j))}$, where $T(m_j)=\{t_b-t_j, t_b>t_j; 0, t_b \leq t_j\}$, $t_b$ is a time the abnormal value is received, and $t_j$ is a time the abnormal behavior begins.

2. The method of claim 1, wherein determining the probability that the at least one of the plurality of components of the IT system is the root cause of the abnormal value includes determining a probability that the abnormal value is abnormal behavior rather than systemic noise.

3. The method of claim 1, wherein determining the probability that the at least one of the plurality of components of the IT system is the root cause of the abnormal behavior includes determining a temporal consistency of received abnormal values.

4. The method of claim 3, wherein determining the probability that the at least one of the plurality of components of the IT system is the root cause of the abnormal behavior includes determining a number of abnormal behaviors associated with each of the plurality of components of the IT system.

5. The method of claim 4, wherein determining the probability that the at least one of the plurality of components of the IT system is the root cause of the abnormal behavior includes determining an average number of abnormal values associated with each of the plurality of components of the IT system.

6. A non-transitory computer-readable medium storing a set of instructions executable by a computer to cause the computer to:
   receive values for at least one performance metric for each of a plurality of components of an IT system to establish a normal value for each of the performance metrics;
   receive an abnormal value that differs from the normal value for at least one of the plurality of components of the IT system;
   determine a probability that the at least one of the plurality of components of the IT system is a root cause of the abnormal value, wherein the probability determination includes a statistical calculation of a probability that the abnormal value is abnormal behavior rather than systemic noise; and
   determine a temporal probability as an exponential function of the probability that the abnormal behavior is actual abnormal behavior rather than systemic noise.

7. The non-transitory computer-readable medium of claim 6, wherein the set of instructions executable by a computer cause the computer to determine a temporal consistency of received abnormal values as a function of the temporal probability and a number of received abnormal values and a number of normal values.

8. The non-transitory computer-readable medium of claim 7, wherein the set of instructions executable by a computer cause the computer to determine a value corresponding to a number of abnormal values for each of the plurality of components of the IT system, wherein each value is equal to a product of a number of performance metrics having received values for each of the plurality of components of the IT system and the temporal consistency having a logarithm base m exponent, wherein m is an adjustable variable.

9. The non-transitory computer-readable medium of claim 8, wherein the set of instructions executable by a computer cause the computer to determine an average of the values corresponding to the number of abnormal values for each of the plurality of components of the IT system.

10. A system for determining root cause, the system comprising a normal value engine, an abnormal value engine, and a probability engine, wherein:
    the normal value engine is configured to receive values for at least one performance metric for each of a plurality of components of an IT system and to establish a normal value for each of the performance metrics;
    the abnormal value engine is configured to receive an abnormal value that differs from the normal value for at least one of the plurality of components of the IT system; and
    the probability engine is configured to determine a probability that the at least one of the plurality of components of the IT system is a root cause of the abnormal value, wherein the probability determination includes a statistical calculation of a complementary value ($P(m_j)$) of a baseline confidence that determines the abnormal value is abnormal behavior rather than systemic noise and determine a temporal probability ($R_1(m_j)$) by the equation: $R_1(m_j)=P(m_j)^{(T(m_j))}$, where $T(m_j)=\{t_b-t_j, t_b>t_j; 0, t_b \leq t_j\}$, $t_b$ is a time the abnormal value is received, and $t_j$ is a time the abnormal behavior begins.

11. The system of claim 10, wherein the probability engine is configured to determine a temporal consistency ($R_2(m_j)$) by the equation: $R_2(m_j)=R_1(m_j)^{(A_j+1-N_j/w)}$, where $A_j$ is a number of abnormal values detected, $N_j$ is a number of normal values detected, and w is a weight of normal values to abnormal values.

12. The system of claim 11, wherein the probability engine is configured to determine a number ($R_a(m_j)$) of abnormal values for each of the plurality of components of the IT system by the equation: $R_a(m_j)=R_2(m_j)^{\log_m M_i}$, where m is an adjustable variable and $M_i$ is a number of performance metrics for a component i of the IT system.

13. The system of claim 12, wherein the probability engine is configured to determine an average ($P(n_i)$) of the values corresponding to the number of abnormal values for each of the plurality of components of the IT system by the equation:

$$P(n_i) = \frac{1}{M_i} \sum_j R_a(m_j).$$

* * * * *